United States Patent [19]

Herzberg

[11] Patent Number: 5,208,577
[45] Date of Patent: May 4, 1993

[54] MARKER LIGHT ARRANGEMENT FOR POWER LINES

[75] Inventor: Rafael C. Herzberg, Paulista-Sao Paulo, Brazil

[73] Assignee: Construcoes Electricas Eltec S.A., Sao Paulo, Brazil

[21] Appl. No.: 897,297

[22] Filed: Jun. 11, 1992

[30] Foreign Application Priority Data

Jun. 20, 1991 [BR] Brazil .................................. 7101294

[51] Int. Cl.⁵ ...................... G01R 19/145; H04L 12/26
[52] U.S. Cl. ........................ 340/310 R; 116/DIG. 33; 324/133; 340/654
[58] Field of Search ....................... 116/202, DIG. 33; 340/654, 310 R; 324/133

[56] References Cited

U.S. PATENT DOCUMENTS

| | | | |
|---|---|---|---|
| 3,785,337 | 1/1974 | Flowerday | 116/209 |
| 3,828,256 | 8/1974 | Liu | 324/133 |
| 4,564,802 | 1/1986 | Collins | 324/133 X |
| 4,724,382 | 2/1988 | Schauerte | 324/133 |
| 4,885,835 | 12/1989 | Osgood | 116/209 X |
| 4,904,996 | 2/1990 | Fernandes | 340/310 R |

FOREIGN PATENT DOCUMENTS 0579838 5/1975 Switzerland ................ 116/DIG. 33

OTHER PUBLICATIONS

D. W. Deno and L. E. Zaffanella, "Electrostatic Effects Of Overhead Transmission Lines and Stations", *Transmission Line Reference Book 345 KV and Above*, published by Electric Power Research Institute, Palo Alto, California 94304, copyright 1975, pp. 248-255.

*Primary Examiner*—Daniel M. Yasich

[57] ABSTRACT

A marker for power lines includes a discharge lamp having one of its terminals connected by a cable and a metal jaw to an overhead ground wire. A second cable electrically connects the other terminal to a metallic energy captor which operates by induction in the electric field of the power lines. A sphere made of translucid material and secured to the lamp envelopes the lamp.

1 Claim, 2 Drawing Sheets

MARKER LIGHT ARRANGEMENT FOR POWER LINES

BACKGROUND AND SUMMARY OF THE INVENTION

The present invention relates to a marker apparatus for power lines, and more particularly to an apparatus which emits lights and warns of the presence of power lines.

The applicant has previously filed Brazilian Application No. PI-8806701 for an "IMPROVED MARKER LIGHT FOR POWER LINES." The marker, which that application describes, includes a discharge lamp with one of its poles electrically connected to the overhead ground wire and the other pole connected to a metallic captor which operates by induction. This marker provides a signal at night to prevent collisions of aircrafts on the power lines.

The applicant found that the marker described above performed its intended function at night, but it did not perform satisfactorily during the day. Sunlight obscures the light discharge of the marker lamp, rendering the marker substantially invisible during the day.

The marker of the present invention avoids the disadvantage described above. It includes a sphere of translucid material having a red-orange color or any other suitable bright color. The sphere reflects light; and its color makes it visible during the day. It is a translucid shell which contains a lamp for emitting light. Accordingly, the light emitted by the lamp makes it luminous and visible at night.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following disclosure describes the invention in connection with one embodiment, one should understand that the invention is not limited to this embodiment. Furthermore, one should understand that the drawings are not to scale and that graphic symbols, diagrammatic representations, and fragmentary views in part illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Figure 1:
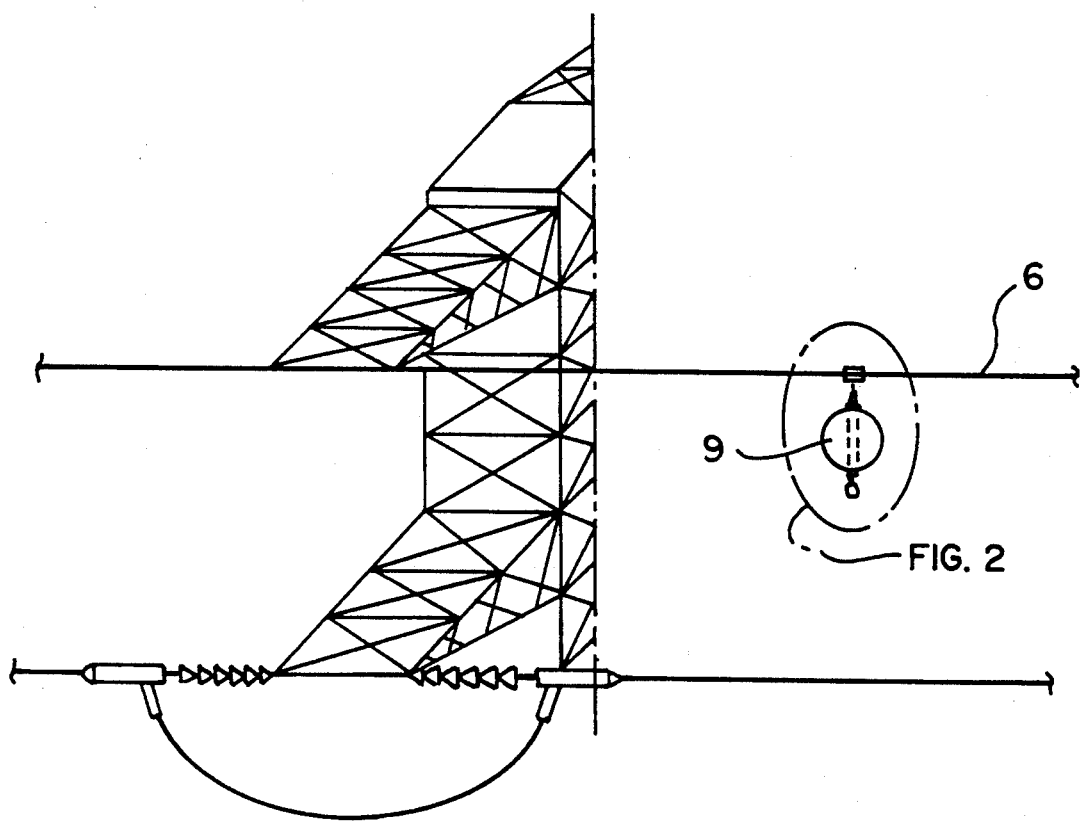
FIG. 1 is a schematic view of the marker apparatus of the present invention shown in place on power lines.
Figure 2:
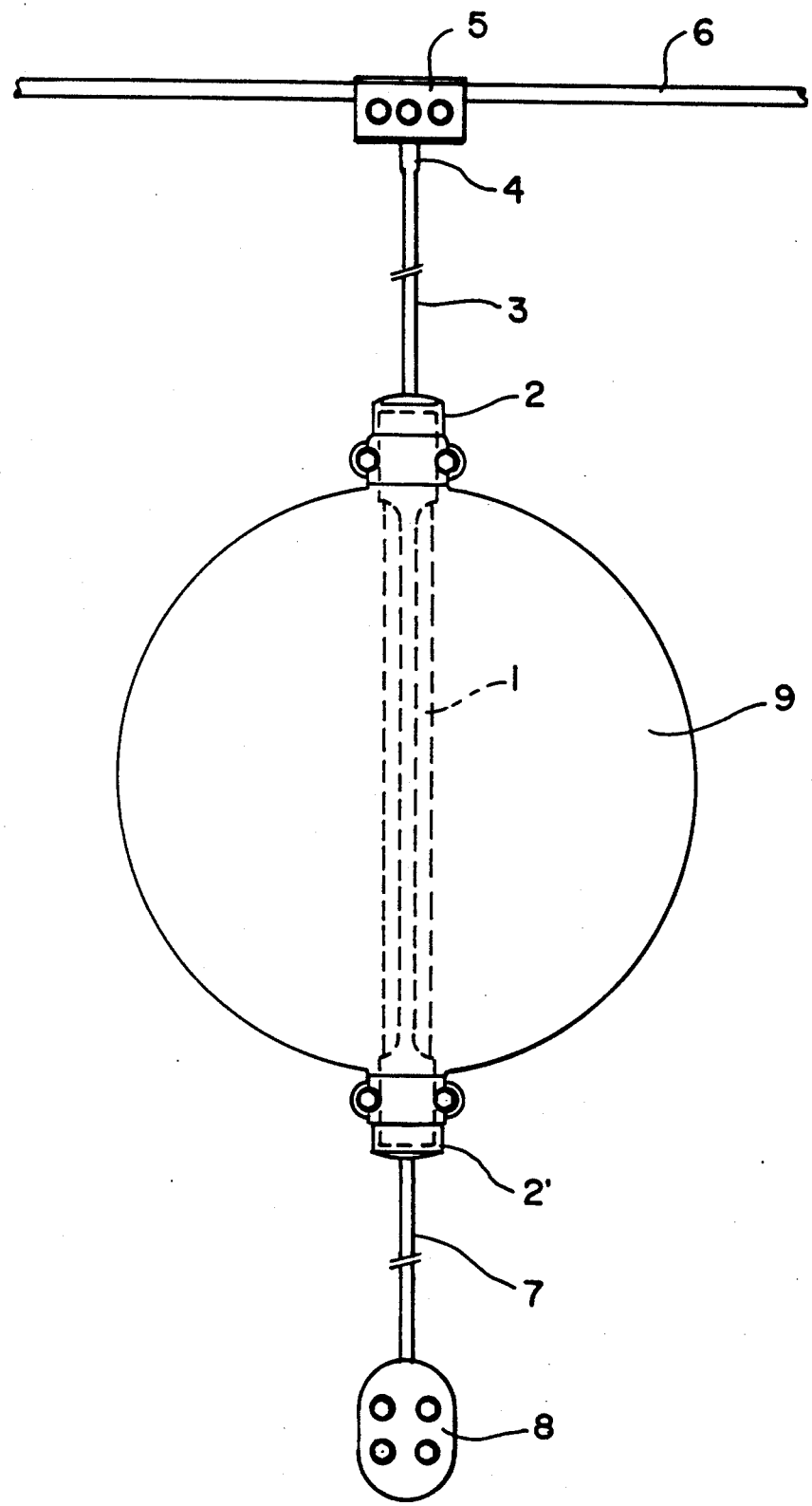
FIG. 2 is an enlarged, front elevation view of the marker shown in FIG. 1.

Turning now to the drawings, FIGS. 1 and 2 show the marker apparatus of the present invention, including a discharge lamp 1, a sphere 9 disposed around the lamp, and a metallic energy captor which operates by induction, 8. An insulated cable 3 secured at one end to a terminal 2 of the lamp 1 and at the other end 4 to a metal jaw 5 co-acts with the jaw 5 to electrically connect the lamp 1 to an overhead ground wire 6 and suspend the lamp from the wire.

A cable 7 secured at one end to the other terminal 2 of the lamp 1 and at the other end to the metallic energy captor 8 electrically connects the lamp 1 to the said metallic energy captor 8 which hangs freely at an appropriate distance from the conductor power line, however, within the electrostatic field of said power line.

The sphere is a shell made of a translucid material of attracting color, e.g., red-orange or any other suitably bright color. It completely surrounds or envelopes the discharge lamp 1; and suitable fastening means fasten it to the lamp as shown in FIG. 2. Its color makes it visible during the day, while the lamp which it contains illuminates it at night.

While the above descriptions and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claim, the applicant intends to cover any such modifications and other embodiments as incorporate those features which constitute the essential features of this invention.

What is claimed is:

1. A marker apparatus for power lines comprising: a discharge lamp, first cable means for electrically connecting the lamp to an overhead ground wire and suspending the lamp from the wire, a metallic energy captor, second cable means for electrically connecting the captor with the lamp, the electrostatic field of the power lines works as a power source to turn on the lamp, by induction, via said metallic energy captor, and a member made of translucid material of attractive and visible color, said member being disposed around the lamp.

* * * * *